(12) United States Patent
Sweazey

(10) Patent No.: US 8,522,360 B2
(45) Date of Patent: Aug. 27, 2013

(54) POSTED MOVE IN ANCHOR POINT-BASED DIGITAL RIGHTS MANAGEMENT

(75) Inventor: Paul Marvin Sweazey, Lyons, CO (US)

(73) Assignee: Seagate Technology LLC, Scotts Valley, CA (US)

(*) Notice: Subject to any disclaimer, the term of this patent is extended or adjusted under 35 U.S.C. 154(b) by 937 days.

(21) Appl. No.: 12/360,817

(22) Filed: Jan. 27, 2009

(65) Prior Publication Data

US 2009/0193526 A1 Jul. 30, 2009

Related U.S. Application Data

(60) Provisional application No. 61/024,174, filed on Jan. 28, 2008.

(51) Int. Cl.
*G06F 21/24* (2006.01)
*H04L 9/00* (2006.01)
*H04N 7/173* (2011.01)

(52) U.S. Cl.
USPC .............................. 726/30; 713/153

(58) Field of Classification Search
USPC .......................... 726/30; 713/153
See application file for complete search history.

(56) References Cited

U.S. PATENT DOCUMENTS

| 2003/0048907 | A1* | 3/2003 | Nakahara et al. | 380/277 |
| 2003/0110376 | A1* | 6/2003 | Wiener et al. | 713/158 |
| 2003/0198351 | A1* | 10/2003 | Foster et al. | 380/281 |
| 2006/0059573 | A1* | 3/2006 | Jung et al. | 726/31 |
| 2006/0085353 | A1* | 4/2006 | Wang et al. | 705/59 |
| 2007/0198419 | A1* | 8/2007 | Park et al. | 705/52 |

* cited by examiner

*Primary Examiner* — Saleh Najjar
*Assistant Examiner* — Shu Chun Gao
(74) *Attorney, Agent, or Firm* — Cesari & Reed, LLP; Kirk A. Cesari

(57) ABSTRACT

An anchor-point based digital rights management provides for a posted move of one or more digital rights between two devices. By executing a posted move, a user (1) disables a binding record of a source user device, thereby terminating authorized use of the digital property instance through at the source anchor point; and (2) enables a different binding record of a target user device, thereby allowing authorized use of the digital property instance through that target anchor point. Such a "move" can accomplished through secure communications links mediated by one or both of a content handler and an anchor point message system.

20 Claims, 6 Drawing Sheets

POSTED MOVE IN ANCHOR POINT-BASED DIGITAL RIGHTS MANAGEMENT

CROSS REFERENCE

This application claims priority to U.S. Provisional Patent Application No. 61/024,174, entitled ANCHOR POINT-BASED DIGITAL RIGHTS MANAGEMENT and filed on Jan. 28, 2008, which is specifically incorporated by reference for all that it discloses and teaches.

BACKGROUND

Digital property is an evolving economic and legal concept that challenges modern technological and legal frameworks. Generally, digital property refers to any digital data that has some manner of ownership attached to it, for example, through copyright protection, trade secret protection, etc. In a typical copyright scenario, copyrights in an original work of authorship (e.g., a photograph) may be attributed to the author (e.g., the photographer). Furthermore, the work may be embodied in the form of digital data (e.g., a digital image file), the copying, distribution, derivation, etc. of which are exclusively within the rights of the author. Accordingly, each instance of the digital data (e.g., each copy of the digital image file) is an instance of the digital property of that author.

The exclusive rights associated with digital property may be transferred (e.g., assigned to another) or licensed for use by others. For example, the photographer may license another party to use a digital image on the party's website, subject to certain limitations to which the parties have agreed. However, once the digital image file is transferred out of the author's control, there is substantial risk of unauthorized copying, use, modification and distribution. Accordingly, Digital Rights Management (DRM) technologies are continually being developed to facilitate the owner's technological and legal control of his or her digital property rights.

Additionally, existing DRM approaches to facilitate moving of digital property instances have proven inadequate, costly, invasive, and inconvenient to the licensed users and/or digital property owners (e.g., being subject to technological breakdowns, such as computer crashes, resulting in a loss of a licensed copies), thereby limiting the widespread acceptance of these approaches. Accordingly, digital property ownership remains exposed to violations of the owner's property rights (e.g., from copying of the digital property by others), and furthermore, consumers remain suspicious of protected digital property. These incompatible factors amplify the transactional costs associated with distributing digital content. In turn, digital property owners/publishers charge higher licensing fees to offset losses caused by digital property theft and consumers find the convenience of unauthorized digital content worth the ethical violations and possible criminal sanctions implicated by obtaining the content through theft. The cycle feeds on itself.

SUMMARY

Implementations described and claimed herein resolve the foregoing concerns by applying an enhanced "book" paradigm to digital property. The book paradigm increases the cost of unauthorized copying, distribution, etc. of digital content while increasing the convenience for a user wishing to obtain legal license to use the particular digital content. Continuing the book paradigm example, a user may purchase a book, which represents a physical object to which the licensed rights in the underlying work are attached. The user obtains certain rights to use the work embodied in the book at purchase and to move the book between different locations. By binding the rights to a physical object, the copyright owner dramatically increases the difficulty to a potential infringer wishing to violate the copyright owner's retained rights. That is, generally, the embodiment of the property in the physical form of the book substantially limits use of the property to those contemplated under the license—the rights to such use being transferred to the new physical possessor of the book at purchase. The new possessor of the book gains and keeps the licensed rights while in possession, while the bookseller loses those rights when he/she gives up possession of the book.

By comparison, the technology described herein binds the transferred rights to a secure, unique, hard-to-falsify physical object (called an "anchor point"). In one implementation, an anchor point is embodied in a highly secure, robust circuit device. The rights are secured in association with the physical anchor point (e.g., the computing or storage device in which the anchor point resides) rather than any individual instance of the digital property—the rights are bound to a binding record maintained by the physical secure anchor point device.

The logical scope or "domain" in which an anchor point controls access to digital content is called the "anchor point domain". Absent the physical anchor point (e.g., outside of the anchor point domain), the digital property is unusable. Additionally, a digital property instance may be moved between different authorized or trusted devices with anchor points. Furthermore, traditional and future DRM approaches may be applied within an anchor point domain to manage the specific rights available, but the rights to use the digital property cannot easily leak outside the anchor point domain. Accordingly, the difficulty in mass digital property theft increases dramatically, which may encourage digital property publishers to lower prices.

In one implementation, the instance of the digital property is typically an encrypted digital data file, object, or stream. Given the appropriate encryption key, a content handler (e.g., a media player) can gain access to the digital property instance and present (e.g., play) it to a user within the rights granted in association with the anchor point. To obtain the appropriate encryption key, the content handler resides within the anchor point domain, such that it has access to the anchor point. That is, the rights are managed through and bound to the anchor point, rather than the digital property instance or some communication connection with a DRM service of the publisher, thereby increasing the convenience to the user. For example, the user may make as many copies of the digital property instance as he or she wants, but each copy is only usable if the content handler has access to unique binding data (e.g., statistically unique) managed by the anchor point to obtain the appropriate decryption key.

The unique binding data, which is stored as part of a binding record, may be stored in a device's anchor point and may limit a user's access to digital property instances. Furthermore, the binding record may be transferred, or moved, from a source anchor point to a target anchor point, thereby allowing the target device to access the target anchor point storing the transferred binding record and thereby use the digital property instance.

A user can use a "posted move" to transfer rights in a particular digital property instance from a source anchor point to a target anchor point. In one example, a first user grants a second user an ability to request a transfer of the first user's rights to a particular digital property instance to the second user (e.g., a friend loaning an audiobook to another friend). By transferring the rights, the second user's rights become active at substantially the same time the first user's rights become disabled. This approach mirrors the book paradigm. The approach also applies to a situation where the first user moves his or her rights from one device (e.g., a computer) to another device (e.g., an MP3 player).

In one implementation, the "posted move" includes requesting a posted move from a rights-holder to a rights-receiver, receiving a posted move message from the rights-holder and transmitting instructions to an anchor point message system to activate new binding records for the rights-receiver after a predefined condition has been satisfied, such as but not limited to, after a transfer time T has expired. Additionally, the rights-holder deletes its own active binding record after the predefined condition has been satisfied. Therefore, after the posted move, the digital property instance may be used by the rights-receiver but may no longer be used by the original rights-holder after the predefined condition has been satisfied. Returning to the book paradigm, the "book" has been "moved" from one user to another.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTIONS OF THE DRAWINGS

DETAILED DESCRIPTIONS

Digital data is inherently copy-able. Legitimate copying (i.e., under most licensing schemes) is allowable, for example, to use the digital data (e.g., copying from a hard disc into memory), to prevent loss (e.g., backing up the digital data to one or more types of storage media), to allow mobility (e.g., to transfer to a new computer, mobile device, etc.), etc. To balance a digital property owner's interests with a digital property user's interests, digital property and the associated rights to use the digital property may be moved between user systems through a posted move, thereby increasing flexibility of use for the digital property user while preserving the rights of the digital property owner. In one implementation, this continued control is achieved through use of a secure device referred to herein as an "anchor point".

An anchor point is a highly secure circuit device that may be incorporated into a computing device, such as a computer, a mobile phone, a hard drive, a monitor, an audio player or component, a set top box, a network appliance, a personal digital assistant (PDA), a television, a digital picture frame, etc. An anchor point may be part of a local consumer device or it may be provided by a remote server through an online service.

Figure 1:
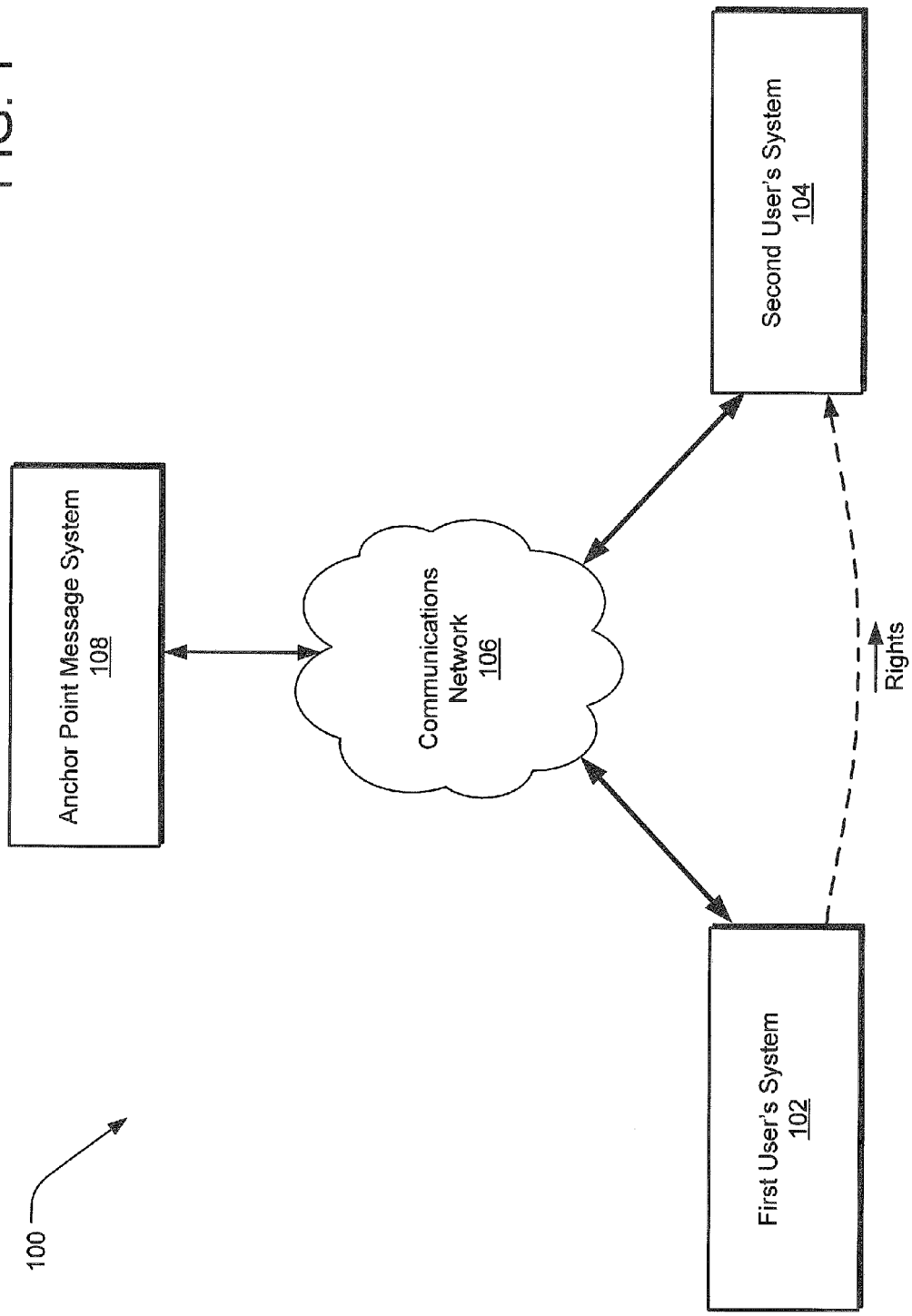
FIG. 1 illustrates an example posted move in an anchor point based digital rights management environment.

FIG. 1 illustrates an example posted move in an anchor point based digital rights management environment 100. In one implementation of the user-to-user scenario, the first user—a rights-holder via a first user system 102 trusts the second user—a rights-receiver at a second user system 104, and therefore allows the second user to use a certain digital property instance of the first user on the second user system 104. For example, the first user may allow the second user to listen to a song on the second user's MP3 player, if the MP3 player has access to the anchor point of the first user over a secure connection. Accordingly, in this first example, the rights to use the song remain bound to the anchor point of the first user system 102.

In contrast, a posted move effects a rights transfer between the first user system 102 and a second user system 104. In this manner, the second user system 104 can continue to use the digital property instance without a secure connection to the anchor point of the first user system 102. Furthermore, the first user system 102 no longer uses the digital property instance without access to the anchor point of the second user system 104. The rights to use the digital property instance have been transferred from the first user system 102 to the second user system 104.

In one implementation, to effect a posted move, the second user system 104 (e.g., a content handler, such as a computer, a portable media player, or a mobile phone) requests a posted move of an identified digital property instance from the first user system 102. Typically, the user systems 102 and 104 are connected via some type of communications link (such as communications network 106, a USB link, a smart card, a flash memory card, etc.). Furthermore, each user system possesses or has the ability to secure access to at least one anchor point. If the first user is willing to trust the second user, the first user system 102 will respond to the second user system 104 with a posted move message.

For example, if the second user wishes to obtain the rights of the first user in the digital property instance, then the second user sends a request to the source active anchor point of the first user system 102 requesting a posted move message. The source anchor point validates the request based on authentication evidence provided by the second user system 104 with the request (e.g., a digital certificate that has been signed and issued by an appropriate certificate authority). If able to validate the requesting system, the source anchor point returns a posted move message to the second user system 104 and schedules the disabling (e.g., deletion or flagging) of its own binding record to the digital property instance. The second user system 104 can then be disconnected from the first user system 102. The encrypted digital property instance can be transferred for access by the second user system 104 at any time over any secure or unsecure connection.

Thereafter, in one implementation, the second user system 104 connects to an anchor point message system 108, transmitting the posted move message received from the first user's active anchor point and identifying a target anchor point associated with the second user system 104. The anchor point message system 108 sends instructions (e.g., with the posted move message) to the target anchor point of the second user system 104 to create a new binding record for the digital property instance. Likewise, an escrow anchor point of the second user system 104 may also receive the instructions, or the escrow anchor point may be equipped with an escrow binding record through a different mechanism. (Escrow binding records represent backups of the active binding records accessed to use an encrypted digital property instance.) The new binding records (e.g., active and escrow) are not activated until the predefined condition (e.g., the transfer time T) is satisfied. More or less concurrently, the source anchor points (e.g., both the active and escrow anchor points) of the first user system 102 disable their own binding records to the digital property instance, thereby completing the posted move.

In an alternative implementation, the second user system 104 connects to the target anchor point directly or indirectly and passes the posted move message to the target anchor point, which creates a new binding record. Likewise, an escrow anchor point of the second user system 104 may also receive the posted move message, or the escrow anchor point may be equipped with an escrow binding record through a different mechanism. The new binding records (e.g., active and escrow) are not activated until the predefined condition (e.g., the transfer time T) is satisfied. More or less concurrently, the source anchor points (e.g., both the active and escrow anchor points) of the first user system 102 disable their own binding records to the digital property instance, thereby completing the posted move.

Although the rights to use the digital property instance have been transferred in the posted move, the second user can receive the encrypted digital property instance and an associated rights object at any time. The combination of these three items (e.g., the binding record, the digital property instance, and the rights object) makes it possible for the second user to use the digital property instance on the second user system 104.

Figure 2:
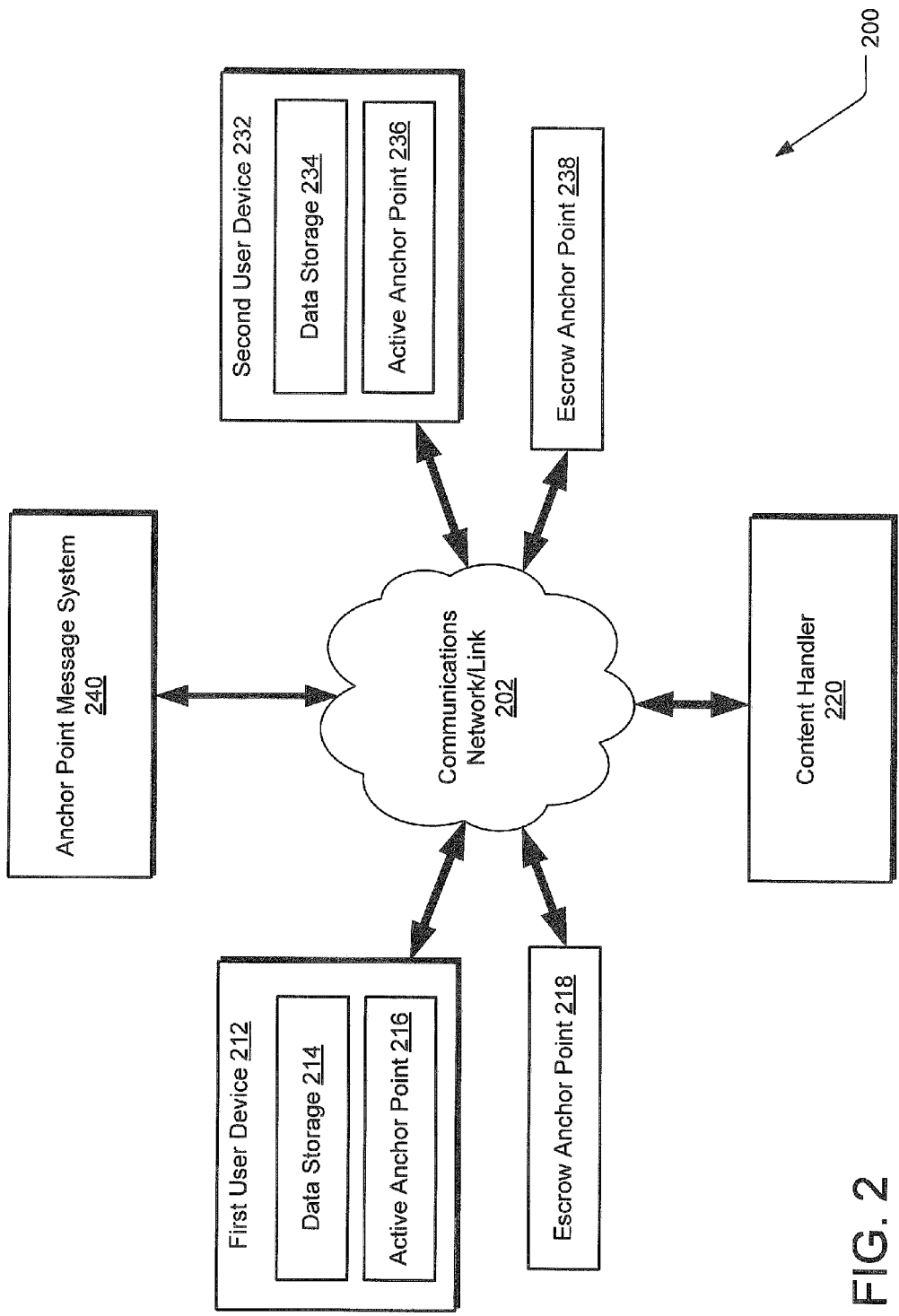
FIG. 2 illustrates an example anchor point based digital rights management environment capable of facilitating a posted move.

FIG. 2 illustrates an example anchor point based digital rights management environment 200 capable of facilitating a posted move. A first user device 212 stores in a first data storage 214 an encrypted digital property instance, which has been "purchased" (i.e., licensed) by a first user, and an associated rights object. In one implementation, the user first decrypts the encrypted digital property instance using a title key in order to use (e.g., view, listen to, etc.) the digital property. The title key is generated through application of a binding record associated with the digital property instance and stored in an active anchor point 216 of the first user. The active anchor point 216 is shown in the first user device 212 as a secure device, such as a microelectronics chip mounted on the motherboard of the first user device 212, a microelectronics chip mounted in the hard disc drive installed in or accessible to the first user device 212, etc. In alternative implementations, the active anchor point may be a secure service, such as an online anchor point service accessible by the first user device 212, or another secure system.

In the illustrated implementation, the active anchor point 216 is also associated with an escrow anchor point 218, which resides in a separate system or service than the active anchor point 216. In one implementation, for example, the escrow anchor point 218 is stored in a remote server and is accessible through an online service. In alternative implementations, escrow anchor point 218 is implemented as an anchor point service accessible by the active anchor point 216 of the first user device 212.

A content handler 220 (e.g., a set-top box, portable media player, etc.) may be employed to use the encrypted digital property instance from the first user device 212, decrypting the digital property instance through application of the title key derived from the binding record stored in the active anchor point 216. The content handler 220 is configured to communicate securely with the first user device 216. In one implementation, this connection is embodied as a direct link (e.g., a USB connection). In another implementation, the connection is accomplished through a communications network 202. In such implementations, the connection may be a secure connection. Generally, a secure communications link is characterized by mutual authentication by public key certificate exchange, session key agreement, and subsequent communication using symmetric encryption, although other secure communications may also be employed.

In one implementation, the content handler 220 requests a posted move from the active anchor point 216. For example, the first user wishes to loan a song to a second user (e.g., the owner and operator of the content handler 220) and therefore agrees to transfer rights to use the song to the second user so that the second user can take the MP3 player home for the weekend and listen to the song on his or her home music system (e.g., the second user device 232). While the second user possesses the rights to use the song, the first user loses the rights (and ability) to use the song.

In one implementation, to request and execute a posted move, the content handler 220 establishes a trust relationship between itself and the active anchor point 216, which initially binds the rights for a particular digital property instance. Such a trust relationship may be achieved by delivering to the active anchor point 216 a copy of the content handler's digital certificate, which has been signed and issued by an appropriate certificate authority.

In one implementation, the content handler 220 can request three types of responses from the active anchor point 216: (1) a title key; (2) a title key and an effective binding record; and (3) a title key and a null binding record, although other types of responses may be requested in other implementations. The title key may be employed to decrypt and therefore use the digital property instance. The effective and null binding records are used to surreptitiously execute the posted move with minimal probability that the original holder of the binding record can detect or prevent the move or that any other observer can distinguish whether the response included an effective or null binding record.

If the content handler 220 merely requests a title key to use the digital property instance, then the active anchor point 216 delivers the title key to the content provider 220 for this purpose. With the title key, the content handler 220 can use the digital property instance temporarily. However, the rights remain bound to the active anchor point 216 and therefore the content handler 220 can only use the digital property instance subject to access to the active anchor point 216. As such, this exchange does not result in a posted move.

If the content handler 220 requests a posted move by specifying a response including a title key and an effective binding record, it also identifies to the active anchor point 216 another active anchor point 236 to which the binding record associated with the digital property instance is to be transferred (i.e., the target anchor point). In one implementation, a posted move request is associated with delivery to the active anchor point 216 of a copy of the digital certificate of the target anchor point that has been signed and issued by an appropriate certificate authority.

The content handler 220 also provides a means by which a secure and confidential message can be created by the active anchor point 216 such that the message can only be correctly interpreted by the target anchor point. In one implementation, this confidential messaging is achieved by use of a public key that is contained in the digital certificate of the target anchor point. For example, the binding record of the digital property instance is encrypted by the active anchor point 216 using a symmetric key encrypted by the public key provided in the certificate of the target anchor point, and then decrypted by the target anchor point using its own private key.

If the content handler 220 requests a title key and an null binding record, then the active anchor point 216 delivers the title key and null or "dummy" binding record, so as to make it impractical for an observer to distinguish between transmission of an effective binding record and a null binding record. This exchange provides the content handler 220 with a title key to use the encrypted digital property instance but does not result in a posted move.

If the content handler 220 requests a title key and effective or null binding record from the active anchor point 216 but only receives a title key, then the content handler 220 ignores and discards the title key is received in response to its request.

In one implementation, a null binding record can be created to make it substantially indistinguishable from an effective binding record to an observer by mimicking the size of an effective binding record. For example, if an effective binding record comprises an encrypted message:

the active binding record of the requested digital property instance (or other binding data needed to generate an active binding record);
a binding record type flag indicating that the binding record is an "effective" binding record;
a specification of a predefined condition (e.g., a transfer time); and
a public key encryption (e.g., using the public key of the target anchor point) of the key used to encrypt the binding record, flag, and predefined condition specification, then a corresponding null binding record may comprise an encrypted message:

arbitrary data having a length approximating that of the active binding record of the requested digital property instance (or other binding data needed to generate an active binding record);
a binding record type flag indicating that the binding record is an "null" binding record;
arbitrary data having a length approximating that of a specification of a predefined condition (e.g., a c); and
a public key encryption (e.g., using the public key of the target anchor point) of the key used to encrypt the preceding information.

The predefined condition defines the condition to be satisfied before the (source) active binding record 216 disables (e.g., deletes) its binding record for the moved digital property instance and the (target) active anchor point 236 activates its new binding record for the moved digital property instance. Similar actions occur with regard to the respective escrow anchor points of the source and target systems. In one implementation, the predefined condition represents a transfer time T when the source anchor point deletes its binding record to the digital property instance and the target anchor point activates its binding record to the digital property instance. For example, the source anchor point schedules deletion of its active and escrow binding records when transfer time T expires. Other predefined conditions, however, may be employed, such a receipt of a message from a centralized messaging system instructing each user device to delete and activate as appropriate.

If the active anchor point 216 does not send an effective binding record, but instead sends a title key only or sends a title key and null binding record, then the active anchor point 216 does not set its binding record for disabling and no posted move is executed by either the active anchor point 216 or the content handler 220.

As described above, if the content handler 220 receives the title key and effective binding record, it has information to be able to transfer the binding record for the digital property instance it identified in its posted move request. The content handler 220 detects that it received an effective binding record based on the binding record type flag. The active binding record (or other binding data needed to generate an active binding record) may be used to generate an active binding record in the active anchor point 236 and an escrow binding record in the escrow anchor point 238. It should be noted that the private key of the target anchor point can be used to decrypt the public key encryption of the key used to encrypt effective binding record data, which allows only the target anchor point to decrypt the effective binding record data.

A framework such as is described above allows a content handler 220 (e.g., the MP3 player of the second user) to request a posted move from the active anchor point 216 and to receive the encrypted digital property instance, an associated rights object, and an effective binding record that will result in the rights (to use the digital property instance) bound to the active anchor point 216 to transfer to a different anchor point (e.g., the target anchor point—active anchor point 236) specified by the content handler 220.

In such an implementation, the content handler 220 receives an encrypted digital property instance and rights object from the first user device 212 (e.g., as transferred from the content handler 220 or via another communication connection, such as the communications network 202) and stores them in the data storage 234. The content handler 220 transmits a posted move request to the active anchor point 216, which includes a digital certificate and an identifier of the target anchor point. In response, the active anchor point 216 returns a posted move message to the content handler 220, which includes the title key and the effective binding record.

In another implementation, the second user device 232 plays the role of the content handler 220 and therefore makes the posted move request to the active anchor point 216 without involvement of the separate content handler 220. In such implementation, a secure connection 204 may be established between the first user device 212 and the second user device 232. For example, the second user device 232 (e.g., a home media player) connects through a communications network 202 to the first user device 212 or through another communications link, such as a USB cable or wireless connection (e.g., WiFi, BlueTooth, mobile phone technology, etc.).

In one implementation, the content handler 220 communicates directly with the active anchor point 236 to complete the posted move. The content handler 220 sends the effective binding record to the active anchor point 236, which decrypts the public key encryption of the key used to encrypt the binding record data. The active anchor point 236 can then use this decrypted key to decrypt the binding record data, store the active binding record (or generate it from the binding record data), and schedule activation of the new active binding record when the predefined condition is satisfied. Further, the active anchor point 236 can use the new active binding record to create an escrow binding record in the escrow anchor point 238. In the meantime, the active anchor point 216 and the escrow anchor point 218 disable (e.g., delete) their corresponding binding records when the predefined condition is satisfied, thereby completing the posted move.

In an alternative implementation, an anchor point message system 240 is used to facilitate the transfer of binding records for the second user device. The anchor point message system 240 receives the posted move message (e.g., including the effective binding record) from the content handler 220 to effect generation of binding records at the second user device 232. For example, the anchor point message system 240 can communicate the posted move message to the active anchor point 236 of the second user device 232 to generate active binding record for the transferred digital property instance. The active anchor point 236 can then back up its new binding record to the escrow anchor point 238.

In one implementation, after the predefined condition has been fulfilled, the generated binding records may be fully activated for and/or accessible for the second user device 232. Accordingly, the second user device 232 may make use of the encrypted digital property instance by accessing the active anchor point 236, which possesses an enabled active binding record for the digital property instance. Additionally, after the predefined condition has been fulfilled, the second user device 232 may restore its active binding using the newly enabled escrow binding record of the escrow anchor point 238. Furthermore, after the predefined condition has been fulfilled, the anchor points 216 and 218 of first user device 212 disable (e.g., delete) the old active and escrow binding records of the first user. In one implementation, after the predefined condition is satisfied, the anchor points 216 and 218 of the first user device 212 receives a command to delete the old binding records from the anchor point message system 240, although internal or external times or monitors could be employed.

Once the newly enabled binding records have been stored in the active anchor point 236 of the second user device 232, the second user device 232 may use the digital property instance in accordance with the associated rights object. As demonstrated through the discussion above, a posted move has the effect of "moving" rights (as represented by an enabled binding record) from a first user device 212 to a second user device 232. The binding record is said to be "moved" rather than "copied" from the first user device 212 because the first user device 212 no longer possess a valid binding record and therefore the first user device 212 can no longer use the associated digital property instance.

Figure 3:
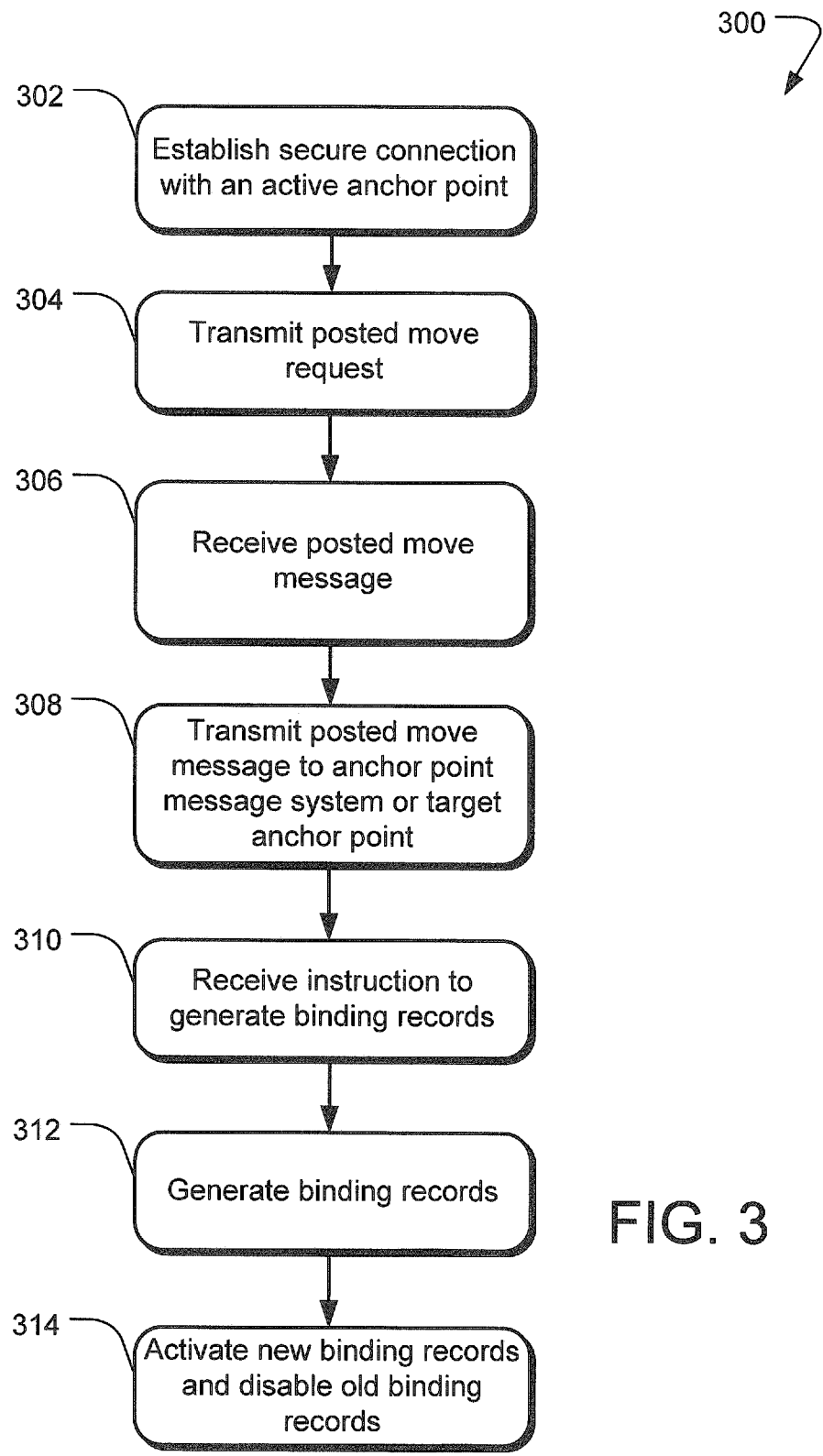
FIG. 3 illustrates example operations for processing a posted move through a target domain in an anchor point based digital rights management environment.

FIG. 3 illustrates example operations 300 for processing a posted move through a target domain in an anchor point based digital rights management environment. By executing a posted move, a user (1) disables a binding record of a first user device, thereby terminating authorized use of the digital property instance through a first anchor point; and (2) enables a different binding record of a second user device, thereby allowing authorized use of the digital property instance through a second anchor point. Such a "move" can be accomplished through a secure communication between the first anchor point and a second anchor point.

In one implementation, a content handler may be used to support a posted move, so that a "circle-of-trust" boundary remains effective. A content handler may not need to physically contain an anchor point or particular secure processing capabilities in order to handle the transfer of binding records between anchor points. As such, the posted move function can be initiated through firmware in existing devices without a hardware modification.

By way of example and not limitation, if a first user trusts an owner of a portable media player (a trusted and secure device), then the first user may allow one of his or her digital property instances to be moved on to the portable media player owned by another. An encrypted digital property instance is transferred from the first user's data storage to that of the second user's portable media player. The new portable media player can then access the first user's anchor point to obtain the title key through a secure connection, thereby gaining use to the encrypted digital property instance for presentation.

Referring to FIG. 3, a receiving operation 302 establishes a secure connection with an active anchor point (i.e., the rights-holder and source anchor point) A request operation 304 transmits a posted move request to the rights-holder. In one implementation, the posted move request includes a request to "move" the active and escrow binding records for the digital property instance to a target (active) anchor point and target (escrow) anchor point of a second user device. Generally, the posted move request is sent during a secure communications session to prevent detection by a party that may try to block binding record moves by sharing parties.

Responsive to this request, the rights-holder's anchor point generates a posted move message, signs it, and encrypts it using a symmetric key that has been encrypted with the public key of the target anchor point and passes the posted move message to be forwarded eventually to the target anchor point. A receiving operation 306 receives the posted move message from the rights-holder. In one implementation, the posted move message is received by the trusted content handler. In another implementation, the posted move message is received directly by the rights-receiver.

In an implementation in which an anchor point message system is used as an intermediary, then the content handler or source anchor point sends the posted move message to the anchor point message in a transmission operation 308. The anchor point message system then forwards the posted move message to the target anchor point to create one or more binding records (e.g., an active binding record and an escrow binding record).

In an alternative implementation, the content handler communicates directly with the target anchor point without involvement of the anchor point message system. For example, the content handler may be integral to or in secure communications with the system having access to the target anchor point when the content handler receives the posted move message from the source anchor point.

A receiving operation 310 receives the instructions and binding data from the anchor point message system, and a generation operation 312 generates the binding records in the active anchor points. In one implementation, the newly created binding records are not activated until fulfillment of a predefined condition, such as but not limited to, duration of time, proximity of the first user device to the second user device, etc. In such an implementation, once the predefined condition is fulfilled, the new binding records are activated and the binding records in the first user domain are disabled, thereby completing the posted move of rights in the digital property instance. In one implementation, the two binding records (active and escrow) are created as non-identical twins with references to the other anchor point of the rights-receiver and flags that identify the binding records as active or escrow binding records.

A completion operation 314 activates the new binding records of the rights-receiver for the digital property instance and disables the old binding records of the original rights-holder for the digital property instance upon fulfillment of the predefined condition. For example, at or about the expiration of transfer time T, the anchor points of the rights-holder delete their binding records for the digital property instance and the anchor point of the rights-receiver activates their binding records for the digital property instances. In one implementation, the active anchor point of the rights-receiver simply will not issue a title key until the predefined condition is satisfied, after which the binding record is considered activated and the title key may be issued. By comparison, the active anchor point of the rights-holder will issue the title key until the predefined condition is satisfied, after which the title key will not be issued and the binding records (e.g., active and escrow) will be disabled (e.g., deleted). In one implementation, if the active anchor point of the rights-holder receives other posted move messages for the same binding record, then it may respond with only a title key, it may respond with a title key and null binding record, or it may respond with a title key, an effective binding record, and a predefined condition that can never be satisfied (e.g., transfer time T="never").

Figure 4:
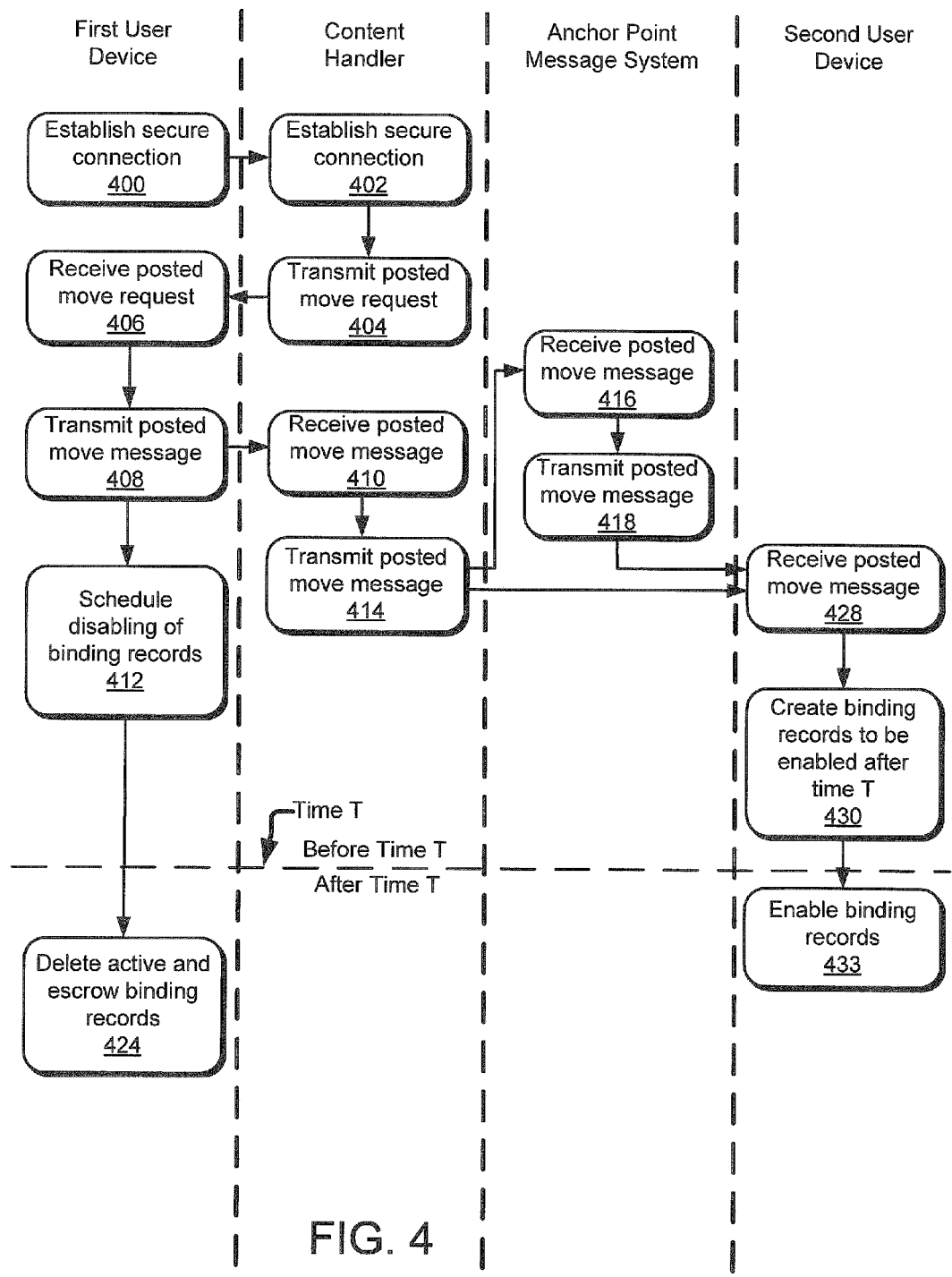
FIG. 4 illustrates example operations for processing a posted moved in an anchor point based digital rights management environment.

FIG. 4 illustrates example operations for processing a posted moved in an anchor point based digital rights management environment. A posted move may be implemented in an anchor point based digital rights management environment to provide a user with additional functionality and flexibility in the use of digital property, while maintaining a level of control and protection for the owner of the digital property. The illustrated anchor point based digital rights management environment includes a first user device, a content handler, an anchor point message system and a second user device, although other implementations are contemplated, including an environment in which the content handler function is physically instantiated within the second user. As such, in one implementation, operations performed by the content handler may be performed by the second user device.

Referring to FIG. 4, security operations 400 and 402 establish a secure communication connection between the anchor point and content handler. The content handler then transmits a posted move request to the first user device at transmission operation 404, which may also include the establishment of a trust relationship between the components (e.g., a transfer of a digital certificate of the content handler). The content handler also delivers to the first user device a copy of the digital certificate of a target anchor point.

At a receiving operation 406, the source anchor point receives the posted move request and generates a posted move message to be sent to the anchor point message system or target anchor point. In one implementation, the source anchor point may generate the posted move message, sign it and encrypt it using key that is encrypted by the public key extracted from the digital certificate of the target anchor point. The posted move message is transmitted from the first user device at transmission operation 408 and is received by the content handler at receiving operation 410. Additionally, at a scheduling operation 412, the first user device may schedule disablement of the active binding records and escrow-binding records associated digital property instance at the first user device after a predefined condition is fulfilled. FIG. 4 depicts the predefined condition fulfillment as an event occurring at a transfer time T, although it should be understood that other conditions may be used to effect the posted move. In alternative implementations, the scheduling operation 412 may be replaced by a monitoring operation that monitors for fulfillment of a predefined condition (e.g., a message received from the anchor point message system instructing the first user device to disable its binding records for the digital property instance).

At a transmission operation 414, the posted move message is transmitted to the anchor point message system or the target anchor point of the second user device. If the posted move message is received by the anchor point message system at a receiving operation 416, the anchor point message system responds by forwarding the posted move message to the target anchor point of the second user device at transmission operation 418. Alternatively, the content handler transmits the posted move message directly to the target anchor point of the second user device without involvement by the anchor point message system.

A receiving operation 428 receives the posted move message at the second user device. A creation operation 428 records active and escrow binding records for the second user device. At fulfillment of the predefined condition (e.g., expiration of transfer time T), an enablement operation 433 enables the binding records of the second user device so that the second user device can use the digital property instance.

At this point, the rights to use the digital property instance have been transferred from the first user device to the second user device. As such, the second user device possesses an enabled binding record that can be used to decrypt the digital property instance. Furthermore, the first user device no longer possesses an enabled binding record to decrypt the digital property instance. It is assumed that the digital property instance and associated rights object are transferred to or accessible by the second user device to allow use by the second user device of the digital property instance in accordance with the limitation defined in the rights object.

Figure 5:
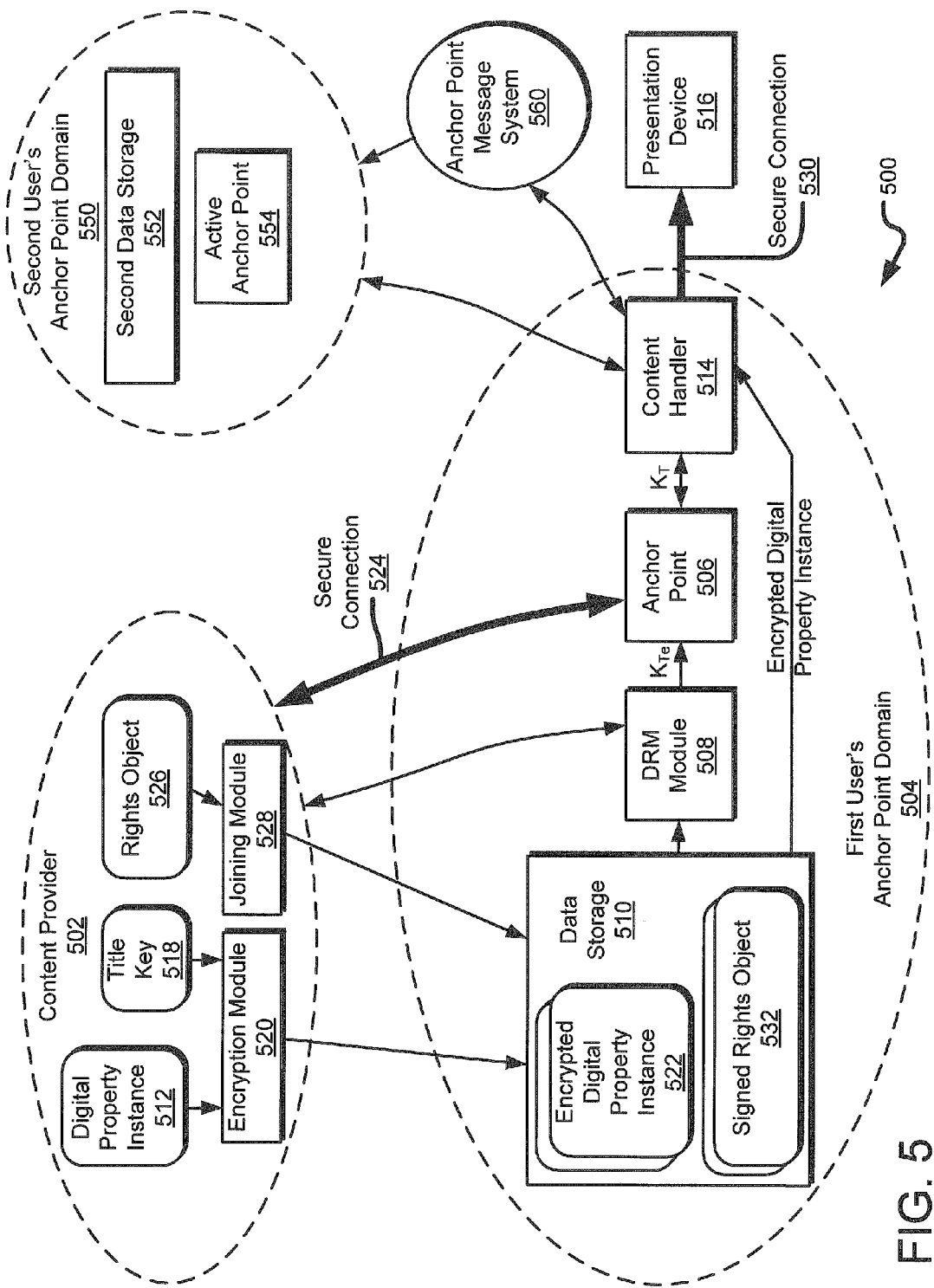
FIG. 5 illustrates an example architecture of anchor point based digital rights management environment capable of facilitating a posted move.

FIG. 5 illustrates an example architecture of anchor point based digital rights management environment 500 capable of facilitating a posted move. A content provider 502 or vendor issues content in the form of digital property instances 512 (or copies thereof). Generally, the content provider 502 interacts with a user within the user's anchor point domain 504 to provide a uniquely encrypted instance 522 of digital property and a signed rights object 532 associated with the digital property instance to declare the licensed rights obtained by the user. Within the user's anchor point domain 504, an anchor point 506, a DRM module 508, and data storage 510 work with the content provider 502 to transfer the uniquely encrypted instance 522 of the digital property and the signed rights object 532 to the user's anchor point domain 504. Thereafter, the content provider 502 need not be involved, although in some implementations, the content provider 502 may become involved again in the future (e.g., to obtained updates to the digital property instance, to obtain replacements of the digital property instance, etc.).

After the digital property instance and the rights object are transferred to the user domain 504, the anchor point 506, the DRM module 508, and data storage 510 work together (without the need to contact the content provider 502) to generate a key to allow a content handler 514 (e.g., a media player device or software module) and a presentation device 516 (e.g., a display device or sound card) to decrypt and present (e.g., play or display) the digital property instance 522 to the user.

Turning more specifically to the implementation illustrated in FIG. 5, assume the content provider 502 receives a request from the user for specific content. The content (e.g., a digital video title) is a form of a digital property that can be embodied in a digital property instance 512 (e.g., a digital video file) by the content provider 502. Typically, the user and content provider will agree on the licensing terms of the transfer, which may represent a broad range of possible transfers. For example, the user may request a 24 hour "rental" of a digital movie title or a perpetual license to play a digital audio title. A goal of the content provider 502 is to transfer a secure instance of the requested title to the user with confidence that the user will only be able to use the title in accordance with the agreed upon terms.

In the first stage, that of transferring the digital property instance and rights object to the user's anchor point domain 504, the content provider 502 chooses a random title key 518 ($K_T$), which is generally expected to be unique among all users and transferred digital property instances, even those associated with the same content title. The content provider 502 encrypts the digital property instance 512 with the title key 518 via an encryption module 520 to yield an encrypted title instance 522, which is communicated (e.g., downloaded)

to the data storage 510 in the user domain 504 through wired networking, wireless networking, or physical means (e.g., "sneaker net").

In one implementation, the content provider 502 also contacts the user's anchor point 506 via a secure connection 524 to obtain a title pre-key. In one specific approach employed over a network, when the user initially requests the content title instance, he or she provides a URL to his or her anchor point 506. The content provider 502 uses this URL to locate the anchor point 506 over the network and to establish the secure connection 524.

The content provider 502 then sends the title key 518 to the anchor point 506 through the secure connection 524. In one implementation, the content provider 502 sends the title key 518 using a create_binding( ) function. Responsive to receipt of the create_binding( ) call, the anchor point 506 generates a binding record, including data such as a binding record identifier (ID), a binding record passkey, a binding key, one or more signing keys, an output security level, etc. The anchor point 506 encrypts the title key using the binding key (randomly generated by the anchor point 506) to yield the title pre-key ($K_{Te}$), which is returned to the content provider 502 via the secure connection 524. The anchor point 506 also sends the binding record ID and binding record passkey to the content provider 502 to be embedded in a rights object that will be transmitted to the data storage 510 in the user domain 504. At this point, the content provider 502 no longer needs the title key and may delete it from its storage.

The content provider 502 also requests a DRM key from the DRM module 508 in the user domain 504. The content provider 502 uses the DRM key to encrypt the title pre-key to yield a license key. The content provider 502 has a definition of licensed rights (e.g., in an XML file) to be associated with the transferred encrypted digital property instance 522 and embeds the license key, the binding record ID, and the binding record passkey into the licensed rights definition to yield a rights object 526. Secret information, such as passkeys, may be encrypted prior to being embedded into a rights object, using some user-supplied secret, so that the user has control over who can access the licensed content.

The rights object 526 is then sent to the anchor point 506 through the secure connection 524 to be signed by the anchor point 506 using a signing key (randomly generated by the anchor point 506) that is associated with the binding record. The anchor point's signature is then returned to the content provider 502 via the secure connection 524, joined to the rights object 526 by a joining module 528, and transferred to the data storage 510 in the user domain 504. The content provider 502 may then recede into the background, as the content provider no longer needs to be involved in the user's use of the digital property instance 522—the user domain 504 has all it needs to use the digital property instance 522. Nevertheless, the content provider 502 may return to the scene to provide beneficial services, including updating and/or replacing digital property instances, etc.

In a second stage, having obtained the encrypted title instance 512 and the signed rights object 532, and having generated a binding record in the anchor point 506, the user's anchor point domain 504 can re-generate a title key required to present the content to the user. In one implementation, the stream of title keys are presented to the content handler 514, which decrypts portions of the digital property instance using these keys. For example, a video file may require decryption by a new title key every 10 frames. As such, the anchor point 506 would provide a new title key every 10 frames to allow the content handler 514 to decrypt the next portion of 10 frames.

The DRM module 508 extracts the license key from the signed rights object 532 and decrypts it using the DRM module's DRM key to obtain the title pre-key. The DRM module 508 also extracts the binding record ID and binding record passkey from the signed rights object 532. The DRM module 508 then passes the title pre-key, binding record ID, and the binding record passkey to the anchor point 506 assuming the DRM module 508 can confirm compliance with the licensed rights defined in the signed rights object 532. With the title pre-key and the binding record information, the anchor point 506 can access the appropriate binding record it is storing to re-generate the title key using its binding key (e.g., the anchor point 506 decrypts the title pre-key using the binding key to generate the title key) and can then pass the title key to the content handler 514 to allow decryption of the encrypted digital property instance 522 and presentation of the content. It should be understood that, in one implementation, the DRM module 508 passes a stream of title pre-keys to the anchor point 506 to allow the anchor point 506 to pass a stream of title keys to the content handler 514.

It should also be noted that the anchor point 506 may also check the signed rights object 532 to verify that the anchor point's most recent signature is contained within the signed rights object 532. This check guards against tampering with the rights object 532. Also, the anchor point 506 may re-sign the signed rights object 532 at each processing to update any changes to the licensed rights. For example, if the digital property title instance is licensed for a total of fifty presentations, the DRM module 508 may decrement the number of available presentations in the rights object to reflect that a number of the available presentations have been used. At this point, the anchor point 506 may re-sign the rights object using a modified signing key to make sure that the most updated version of the rights object is used by the DRM module 508.

At this point, the encrypted title instance 522 may be retrieved from data storage 510 by the content handler 514, which decrypts the encrypted digital property instance 522 using the title key to yield a digital property instance that can be presented to the user via the presentation device 516 (connected to the content handler 514 through a secure connection 530).

In one alternative implementation, the binding process can be set up in a slightly inverted manner. In this implementation, when setting up the binding, the content provider 502 generates a title pre-key, instead of a title key, and sends the title pre-key to the anchor point 506, which generates the title key and returns it to the content provider 502 for use in encrypting the digital property instance 512. In this implementation, the anchor point 506 decrypts the vendor-provided title pre-key using a binding key to obtain the title key. Then, when the user attempts to decrypt and present the encrypted title instance, the anchor point still receives the title pre-key from the DRM module and decrypts the title pre-key using its binding key to obtain the title key. In yet another alternative implementation, the anchor point 506 generates both the title key and the title pre-key, providing these to the content provider 502.

In another implementation, having generated a binding record in the anchor point 506, the user domain 504 can create a back-up (i.e. escrow) copy of the binding record. For example, a user can create a escrow binding record and store the binding record in an escrow anchor point that resides on another user device, such as an external hard drive, memory device, internet storage location, etc. to avoid possible loss of accessing rights if the original binding record is destroyed, lost, tampered with, etc. In one implementation, the anchor point 506 copies sufficient data to allow for recovery of the binding record. This information is then transmitted and stored in an escrow anchor point. Alternatively, the data sufficient for recovery of the binding record may be retrieved through a connection with the content provider 502 and stored in an escrow anchor point.

In operation, the transmission of the escrow binding record to the escrow anchor point can be achieved by providing the URL of an escrow anchor point to the anchor point 506. When the anchor point 506 creates the binding record, it contacts the escrow anchor point and provides sufficient information for the escrow anchor point to create the escrow binding record.

In another implementation, a binding record and an escrow binding record are created as non-identical twin pairs. Although each binding record in a pair is uniquely distinguishable, they both store the same useful information including the binding record identifier and keys. In this implementation one binding record can be referred to as the "active binding record" (or just the "binding record") and the other binding record can be referred to as the "escrow binding record." The binding records differ from each other in that each binding record stores a URL pointing to the anchor point in which its twin resides and a flag that is set or cleared to distinguish between the active binding record and the escrow binding record.

In a third stage, having obtained the encrypted title instance 512 (e.g., a digital property instance) and the signed rights object 532, and having generated an active binding record in the anchor point 506, the user's anchor point domain 504 can move the binding record to a second user's anchor point domain 550. In one implementation, the second user's anchor point domain 550 includes or has access to a second data storage 552 and an active anchor point 554. Furthermore, in one implementation, the second user domain also has access to an escrow anchor point (not shown).

By way of example and not limitation, the second user's anchor point domain 550 may include a new portable media player, a computer, and/or other systems. The content handler 514 send to the original anchor point 506 a posted move request to move the active and escrow binding records for a digital property instance to the different identified active anchor point 554 and its associated escrow anchor point. Responsive to this request, the original anchor point 506 may generate a posted move message, sign it and encrypt it using a public key of the identified active anchor point 554 and pass that message to the new portable media player 550 to be forwarded eventually to identified active anchor point 554 (e.g., either directly or via the anchor point message system 560 when a connection is made available to the content handler 514). The original anchor point 506 also marks its own binding records to expire in response to a predefined condition, such as at a time T, after which the binding records would no longer be valid and could no longer generate a valid title key in the first user domain.

Returning to the above example, after the content handler 514 obtains a connection to active anchor point 554 or the anchor point message system 560, the posted move message to the active anchor point 554 or the anchor point message system 560. If the transmission is to the anchor point message system 560, then the anchor point message system 560 may then forward the message to the new active anchor point 554 when a communications connection is available between them. In one implementation, non-identical twin binding records are created at the active anchor point 554 and the escrow anchor point that are not valid until fulfillment of a predefined condition, such as but not limited to, after a time T. After the predefined condition is fulfilled, the new binding records are enabled in the active anchor point 554 and the escrow anchor point, and the original active binding record are be disabled (e.g., deleted or flagged as disabled) at the original anchor point 506 and the original escrow anchor point. In operation, if the posted move message does not reach the active anchor point 554 until after the predefined condition is fulfilled, then the digital property instance 512 is not usable by anyone until the active anchor point 554 receives the message and the binding records are enabled.

Figure 6:
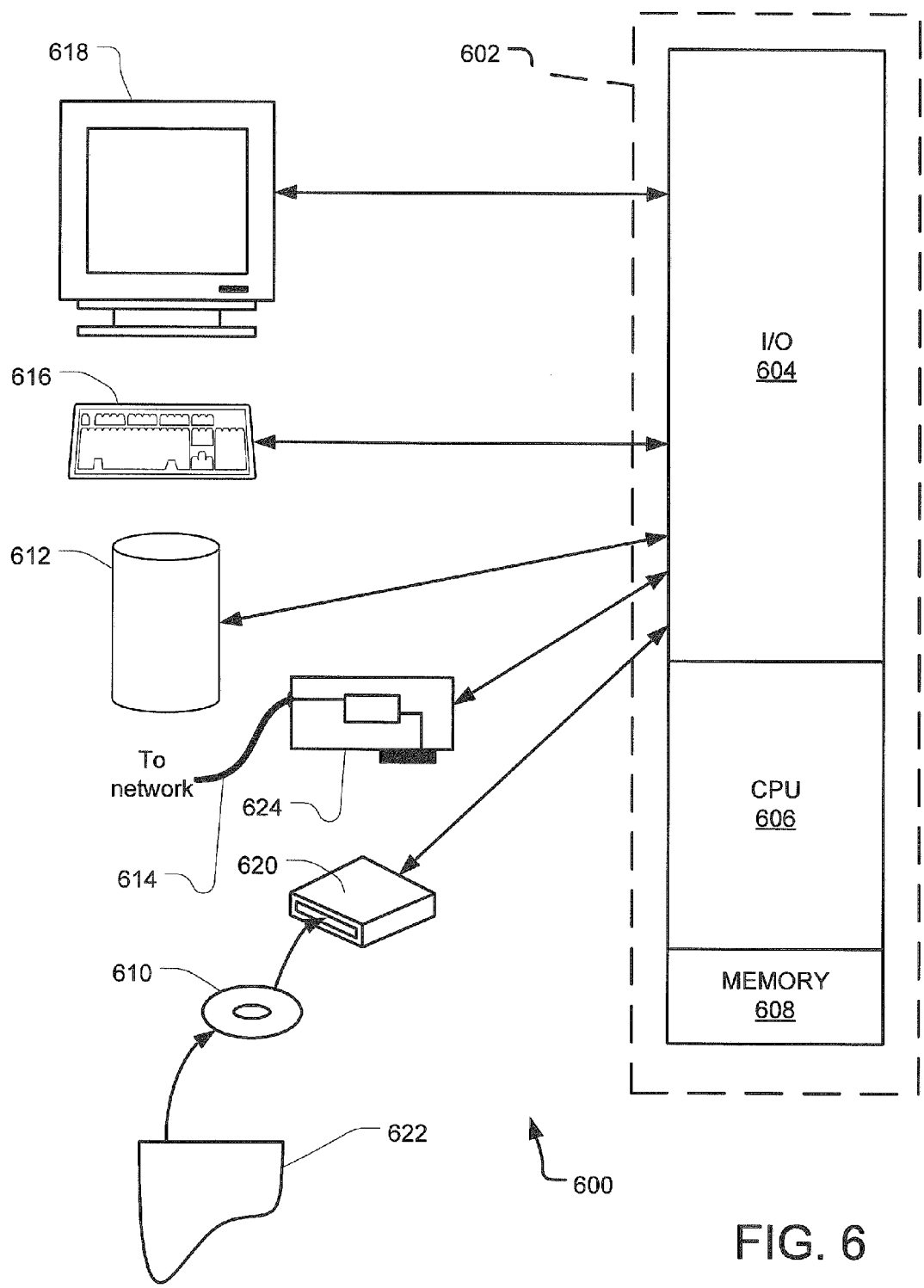
FIG. 6 illustrates an example system that may be useful in implementing the described technology.

FIG. 6 illustrates an example system that may be useful in implementing the described technology. A general purpose computer system 600 is capable of executing a computer program product to execute a computer process. Data and program files may be input to the computer system 600, which reads the files and executes the programs therein. Some of the elements of a general purpose computer system 600 are shown in FIG. 6 wherein a processor 602 is shown having an input/output (I/O) section 604, a Central Processing Unit (CPU) 606, and a memory section 608. There may be one or more processors 602, such that the processor 602 of the computer system 600 comprises a single central-processing unit 606, or a plurality of processing units, commonly referred to as a parallel processing environment. The computer system 600 may be a conventional computer, a distributed computer, or any other type of computer. The described technology is optionally implemented in software devices loaded in memory 608, stored on a configured DVD/CD-ROM 610 or storage unit 612, and/or communicated via a wired or wireless network link 614 on a carrier signal, thereby transforming the computer system 600 in FIG. 6 to a special purpose machine for implementing the described operations.

The I/O section 604 is connected to one or more user-interface devices (e.g., a keyboard 616 and a display unit 618), a disk storage unit 612, and a disk drive unit 620. Generally, in contemporary systems, the disk drive unit 620 is a DVD/CD-ROM drive unit capable of reading the DVD/CD-ROM medium 610, which typically contains programs and data 622. Computer program products containing mechanisms to effectuate the systems and methods in accordance with the described technology may reside in the memory section 604, on a disk storage unit 612, or on the DVD/CD-ROM medium 610 of such a system 600. Alternatively, a disk drive unit 620 may be replaced or supplemented by a floppy drive unit, a tape drive unit, or other storage medium drive unit. The network adapter 624 is capable of connecting the computer system to a network via the network link 614, through which the computer system can receive instructions and data embodied in a carrier wave. Examples of such systems include SPARC systems offered by Sun Microsystems, Inc., personal computers offered by Dell Corporation and by other manufacturers of Intel-compatible personal computers, PowerPC-based computing systems, ARM-based computing systems and other systems running a UNIX-based or other operating system. It should be understood that computing systems may also embody devices such as Personal Digital Assistants (PDAs), mobile phones, gaming consoles, set top boxes, etc.

When used in a LAN-networking environment, the computer system 600 is connected (by wired connection or wirelessly) to a local network through the network interface or adapter 624, which is one type of communications device. When used in a WAN-networking environment, the computer system 600 typically includes a modem, a network adapter, or any other type of communications device for establishing communications over the wide area network. In a networked environment, program modules depicted relative to the computer system 600 or portions thereof, may be stored in a remote memory storage device. It is appreciated that the network connections shown are exemplary and other means of and communications devices for establishing a communications link between the computers may be used.

In an exemplary implementation, anchor points, DRM modules, content handlers, and other modules may be incorporated as part of the operating system, application programs, or other program modules. Orders logs, products databases, user databases, order code databases, transaction logs, and other data may be stored as program data.

The technology described herein is implemented as logical operations and/or modules in one or more systems. The logical operations may be implemented as a sequence of processor-implemented steps executing in one or more computer systems and as interconnected machine or circuit modules within one or more computer systems. Likewise, the descriptions of various component modules may be provided in terms of operations executed or effected by the modules. The resulting implementation is a matter of choice, dependent on the performance requirements of the underlying system implementing the described technology. Accordingly, the logical operations making up the embodiments of the technology described herein are referred to variously as operations, steps, objects, or modules. Furthermore, it should be understood that logical operations may be performed in any order, unless explicitly claimed otherwise or a specific order is inherently necessitated by the claim language.

The above specification, examples and data provide a complete description of the structure and use of example embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention. In particular, it should be understood that the described technology may be employed independent of a personal computer. Other embodiments are therefore contemplated. It is intended that all matter contained in the above description and shown in the accompanying drawings shall be interpreted as illustrative only of particular embodiments and not limiting. Changes in detail or structure may be made without departing from the basic elements of the invention as defined in the following claims.

Although the subject matter has been described in language specific to structural features and/or methodological arts, it is to be understood that the subject matter defined in the appended claims is not necessarily limited to the specific features or acts described above. Rather, the specific features and acts described above are disclosed as example forms of implementing the claimed subject matter.

What is claimed is:

1. A method comprising:
   moving a digital right to use an encrypted digital property instance from a source anchor point to a target anchor point, an anchor point includes a physical, secure, unique, hard-to-falsify circuit device where the digital right is secured in association with the physical, secure, unique, hard-to-falsify circuit device, including:
   transmitting a posted move request to the source anchor point that binds the digital right to use the encrypted digital property instance, the posted move request identifying the target anchor point;
   receiving a posted move message from the source anchor point, the posted move message including an effective binding record for the encrypted digital property instance, the effective binding record including binding data allowing the target anchor point to generate a title key that decrypts the encrypted digital property instance; and
   forwarding the posted move message to the target anchor point for generation of an active binding record to bind in the target anchor point.

2. The method of claim 1 wherein the effective binding record specifies a predefined condition that, when satisfied, results in disablement of a binding record of the digital property instance in the source anchor point.

3. The method of claim 1 wherein the effective binding record specifies a predefined condition that, when satisfied, results in disablement of a binding record of the digital property instance in the source anchor point, wherein the predetermined condition specifies expiration of a transfer time.

4. The method of claim 1 wherein the effective binding record specifies a predefined condition that, when satisfied, results in enablement of a binding record of the digital property instance in the target anchor point.

5. The method of claim 1 wherein the effective binding record specifies a predefined condition that, when satisfied, results in enablement of a binding record of the digital property instance in the target anchor point, wherein the predetermined condition specifies expiration of a transfer time.

6. The method of claim 1 wherein the receiving operation is accomplished by a content handler and further comprising:
   establishing a trust relationship between a content handler and the source anchor point prior to the receiving operation.

7. The method of claim 1 wherein the receiving operation is accomplished by a content handler and further comprising:
   transmitting a digital certificate of the content handler to the source anchor point.

8. The method of claim 1 further comprising:
   transmitting a digital certificate of the target anchor point to the source anchor point.

9. The method of claim 1 wherein at least a portion of the posted move message is encrypted using a key that allows the target anchor point to decrypt the at least a portion of the posted move message.

10. The method of claim 1 wherein the forwarding operation comprises:
    transmitting the posted move message through an anchor point message system for subsequent transmission to the target anchor point.

11. A computer-readable storage device encoding a computer program for executing on a computing system a computer process for moving a digital right to use an encrypted digital property instance from a source anchor point to a target anchor point, an anchor point includes a physical, secure, unique, hard-to-falsify circuit device where the digital right is secured in association with the physical, secure, unique, hard-to-falsify circuit device, the computer process comprising:
    transmitting a posted move request to the source anchor point, that binds the digital right to use the encrypted digital property instance, the posted move request identifying the target anchor point;
    receiving a posted move message from the source anchor point, the posted move message including an effective binding record for the encrypted digital property instance, the effective binding record including binding data allowing the target anchor point to generate a title key that decrypts the encrypted digital property instance; and
    forwarding the posted move message to the target anchor point for generation of an active binding record for storage in the target anchor point.

12. The computer-readable storage device of claim 11 wherein the effective binding record specifies a predefined condition that, when satisfied, results in disablement of a binding record of the digital property instance in the source anchor point and enablement of a binding record of the digital property instance in the target anchor point.

13. The computer-readable storage device of claim 11 wherein the effective binding record specifies a predefined condition that, when satisfied, results in disablement of a binding record of the digital property instance in the source anchor point and enablement of a binding record of the digital property instance in the target anchor point, wherein the predetermined condition specifies expiration of a transfer time.

14. The computer-readable storage device of claim 11 wherein the receiving operation is accomplished by a content handler and further comprising:
    establishing a trust relationship between a content handler and the source anchor point prior to the receiving operation.

15. The computer-readable storage device of claim 11 wherein the receiving operation is accomplished by a content handler and further comprising:
    transmitting a digital certificate of the content handler to the source anchor point.

16. The computer-readable storage device of claim 11 further comprising:
    transmitting a digital certificate of the target anchor point to the source anchor point.

17. The computer-readable storage device of claim 11 wherein at least a portion of the posted move message is encrypted using a key that allows the target anchor point to decrypt the at least a portion of the posted move message.

18. The computer-readable storage device of claim 11 wherein the forwarding operation comprises:
    transmitting the posted move message through an anchor point message system for subsequent transmission to the target anchor point.

19. An anchor point based digital rights management system comprising:
    a source anchor point that binds a digital right to use an encrypted digital property instance, an anchor point includes a physical, secure, unique, hard-to-falsify circuit device where the digital right is secured in association with the physical, secure, unique, hard-to-falsify circuit device;
    a target anchor point; and
    a content handler configured to securely communicate with the source anchor point and the target anchor point that requests and receives a posted move message from the source anchor point, the posted move message including an effective binding record for the encrypted digital property instance, the effective binding record including binding data allowing the target anchor point to generate a title key that decrypts the encrypted digital property instance, the content handler further forwarding the posted move message to the target anchor point to transfer a digital right to use the encrypted digital property instance from the source anchor point to the target anchor point.

20. The anchor point based digital rights management system of claim 19 further comprising:
    an anchor point message system through which the posted move message is communicated from the content handler to the target anchor point.

* * * * *